US007306145B2

(12) United States Patent
Sakai

(10) Patent No.: US 7,306,145 B2
(45) Date of Patent: Dec. 11, 2007

(54) CONTROL SYSTEM AND CONTROL METHOD

(75) Inventor: Tatsuhiko Sakai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/419,809

(22) Filed: May 23, 2006

(65) Prior Publication Data

US 2006/0278702 A1 Dec. 14, 2006

(30) Foreign Application Priority Data

Jun. 10, 2005 (JP) ............................ 2005-171655

(51) Int. Cl.
*G06K 5/00* (2006.01)

(52) U.S. Cl. ........................ 235/382; 340/5.7; 340/5.8; 340/5.81

(58) Field of Classification Search ................ 235/380, 235/382, 449, 451, 472.02, 492, 382.5; 340/5.2-5.33, 340/5.6, 5.61, 5.64-5.7, 5.81, 5.8
See application file for complete search history.

(56) References Cited

U.S. PATENT DOCUMENTS 4,808,803 A * 2/1989 Magier et al. .............. 235/382
5,095,196 A * 3/1992 Miyata ........................ 235/382
6,442,532 B1 * 8/2002 Kawan ...................... 705/36 R
6,747,564 B1 * 6/2004 Mimura et al. .......... 340/825.6
6,869,014 B2 * 3/2005 Gerstenkorn ................ 235/385
2001/0026552 A1 * 10/2001 Spratt et al. ................ 370/390
2002/0183078 A1 * 12/2002 Hase .......................... 455/458
2003/0128100 A1 * 7/2003 Burkhardt et al. ........... 340/5.8
2005/0083171 A1 * 4/2005 Hamilton .................... 340/5.7
2005/0146417 A1 * 7/2005 Sweatte ...................... 340/5.2
2006/0121885 A1 * 6/2006 Engstrom et al. ........... 455/411

FOREIGN PATENT DOCUMENTS

JP 2004-32519 A1 1/2004

* cited by examiner

*Primary Examiner*—Michael G. Lee
*Assistant Examiner*—Tuyen Kim Vo
(74) *Attorney, Agent, or Firm*—Canon USA, Inc., IP Division

(57) ABSTRACT

A control system manages a user's entry into and exit from an area based on the ID information of a device in the user's possession. The control system includes a determining unit that determines, based on the ID information of the device, whether the user can enter or exit the area, and a transmitting unit that transmits, based on the result of the determination by the determining unit, setting information of an apparatus located in the area to the device.

18 Claims, 9 Drawing Sheets

| ESSID INFORMATION | WIRELESS SETTING INFORMATION |
|---|---|
| AP-1 | Mode= "Managed"<br>Authentication= "WPAPSK"<br>Encryption= "TKIP"<br>Key= "581e6eff7448479ea6b34a61a7eca978<br>eae6b04b7298582e57da153ca4ce2581" |
| AP-2 | Mode= "Managed"<br>Authentication= "None"<br>Encryption= "None"<br>Key= "None" |

| ID INFORMATION | AVAILABLE ACCESS POINT ESSID INFORMATION |
|---|---|
| Id_1 | AP-1, AP-2 |
| Id_2 | AP-1 |
| Id_3 | |
| Id_4 | AP-1, AP-2 |

CONTROL SYSTEM AND CONTROL METHOD

BACKGROUND OF THE INVENTION

1. Field of the Invention

The present invention relates to a control system for managing users' entrance into and exit from a specific area and a method for controlling the same.

2. Description of the Related Art

Recently, as wireless communication technology including wireless local area networks (LANs) based on the Institute of Electrical and Electronics Engineers (IEEE) 802.11 has been developed, wired communication systems have been increasingly replaced with wireless communication systems in, for example, the home or office environment.

Moreover, in addition to the replacement of wired communication with wireless communication, short-range wireless communication methods, such as near field communication (NFC), have become increasingly popular. Devices that have an NFC function can communicate with each other by merely being brought close to one another. Thus, NFC is used for, for example, payment or access to various types of service. Moreover, wireless communication is used, for example, when key information that is required by a user to view a pay-per-view broadcast or data that is distributed when the user passes through a ticket gate is stored in an integrated circuit (IC) card, as disclosed in Japanese Patent Laid-Open No. 2004-032519.

In these situations, it is anticipated that wireless communication, such as wireless LANs or NFC, will become increasingly available, resulting in various types of devices performing wireless communication in various environments, with users increasingly using such devices.

In an environment in which many types of devices communicate wirelessly and these communications occur in various situations, these devices need to be set to support wireless communication so that these devices can readily wirelessly communicate in any situation. For example, when the same notebook personal computer (PC) is used at home and in an office, the notebook PC needs to connect to different access points that operate in the individual environments. Thus, parameters of the individual access points such as extended service set identifiers (ESSIDs), encryption methods, encryption keys, etc., need to be appropriately set.

Accordingly, in an environment in which wireless communication is widely available, settings related to wireless communication need to be readily and appropriately performed in order to quickly and efficiently set devices so that the devices can begin to wirelessly communicate.

A significant number of parameters, such as communication mode, encryption method, authentication method, encryption key, etc. are required for wireless communication. Typically, it becomes very cumbersome for a user to manually input the various parameters required for wireless communication into a device. In many cases, the user ends up erroneously setting one or more of the parameters.

In cases where devices support wireless communication, but have little or input interfaces, such as digital cameras and printers, it is either increasingly cumbersome for the user to set the parameters or the user can not set them at all.

SUMMARY OF THE INVENTION

The present invention provides a way to quickly and efficiently set information that enables the use of a device located in a certain area.

More specifically, one aspect of the present invention provides a control system that manages a user's entry into and exit from an area based on identification information of a device in the user's possession. The control system includes a determining unit that determines, based on the ID information of the device, whether the user can enter or exit the area, and a transmitting unit that transmits, based on the result of the determination by the determining unit, setting information of an apparatus located in the area to the device.

Another aspect of the present invention provides a method for controlling a control system that manages a user's entry into and exit from an area based on ID information of a device in the user's possession. The method includes determining, based on the ID information of the device, whether the user can enter or exit the area, and transmitting, based on the result of the determination, setting information of an apparatus used in the area to the device.

Further features of the present invention will become apparent from the following description of exemplary embodiments with reference to the attached drawings.

DESCRIPTION OF THE EMBODIMENTS

Exemplary embodiments according to the present invention will now be described in detail with reference to the attached drawings as necessary.

First Exemplary Embodiment

Structure of Entrance-and-Exit Management System

Figure 1:
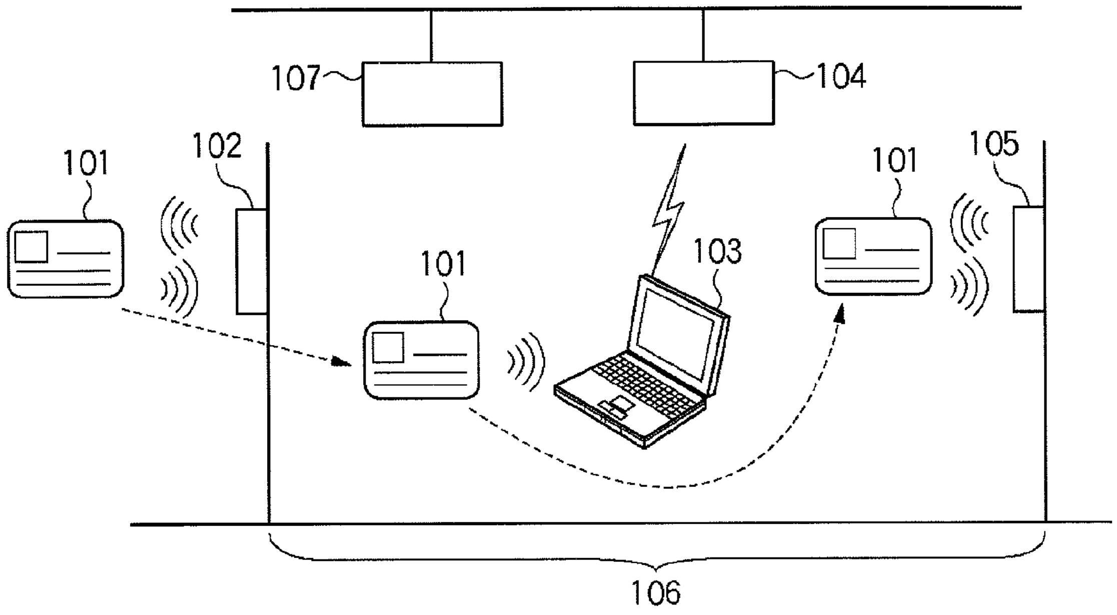
FIG. 1 shows the structure of an entrance-and-exit management system according to a first exemplary embodiment of the present invention.

FIG. 1 shows the structure of an entrance-and-exit management system according to a first exemplary embodiment of the present invention. The entrance-and-exit management system according to the first exemplary embodiment includes a security card (e.g., processing device) 101, a first entrance-and-exit control device 102, a PC 103, a first access point 104, a second entrance-and-exit control device 105, and a second access point 107.

In the first exemplary embodiment, the security card 101, the first entrance-and-exit control device 102, the PC 103, the second entrance-and-exit control device 105 include a Near Field Communication (NFC) function. The PC 103, the first access point 104, and the second access point 107 include a wireless LAN communication function. The wireless LAN communication function described below is a wireless communication function based on the IEEE 802.11. Alternatively, the wireless LAN communication function may be based on another communication method. Moreover, NFC is one short-range wireless communication standard, and another method may be adopted.

In the entrance and exit processing of the entrance-and-exit management system according to the first exemplary embodiment, a user holds the security card 101 close to the first entrance-and-exit control device 102 when the user enters an area 106. Data, such as the ID information of the user, is exchanged between the security card 101 and the first entrance-and-exit control device 102 by NFC through this operation. The first entrance-and-exit control device 102 determines, on the basis of the received user ID information, whether the user can enter the area 106.

When the entrance and exit processing has successfully completed, and the user has been permitted to enter the area 106, the first entrance-and-exit control device 102 transfers to the security card 101, by NFC, wireless setting information that is required to wirelessly communicate with the first access point 104 in the area 106. The wireless setting information includes among other things, an extended service set identifier (ESSID), an encryption method, and an encryption key. The security card 101 stores the wireless setting information transferred by NFC in a storage unit 202. The ESSID is a network ID for identifying a network formed by an access point.

The user transfers the wireless setting information to the PC 103 by NFC by holding the security card 101 close to the PC 103 after the user has entered the area 106. The PC 103 stores the wireless setting information transferred from the security card 101 and wirelessly communicates with the first access point 104 using the wireless setting information.

Structure of Security Card

Figure 2:
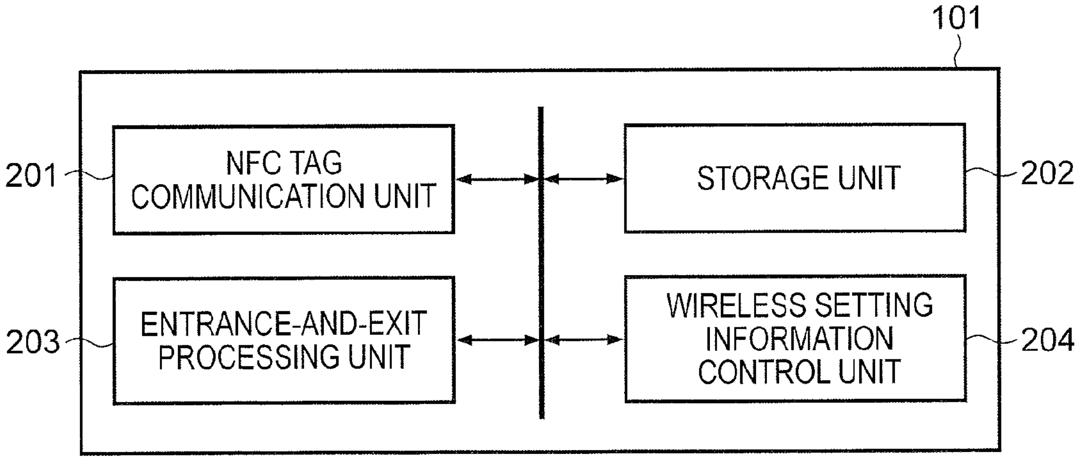
FIG. 2 is a functional block diagram of a security card that is used in the entrance-and-exit management system according to the first exemplary embodiment of the present invention.

The structure of the security card 101 according to the first exemplary embodiment will now be described with reference to a functional block diagram shown in FIG. 2.

The security card 101 includes among other things, an NFC tag communication unit 201, a storage unit 202, an entrance-and-exit processing unit 203, and a wireless setting information control unit 204.

The NFC tag communication unit 201 is activated by power that is supplied by electromagnetic induction from a radio frequency (RF) field produced between the NFC tag communication unit 201 and an NFC reader-and-writer unit within communication range. The NFC tag communication unit 201 performs NFC by responding to a request from the NFC reader-and-writer unit.

The storage unit 202 stores, for example, the ID information of the security card 101, which is used in the entrance and exit processing, and wireless setting information transferred from the entrance-and-exit control devices 102 and 105.

The entrance-and-exit processing unit 203 transmits the ID information stored in the storage unit 202 in response to a request message for ID information from the entrance-and-exit control device 102 when the user enters or exits the area 106.

The wireless setting information control unit 204 transmits the wireless setting information stored in the storage unit 202 in response to a request message for wireless setting information from the PC 103. The wireless setting information control unit 204 also deletes the wireless setting information stored in the storage unit 202 in response to a message requesting deletion of wireless setting information from the entrance-and-exit control device 102 or 105.

Structure of Entrance-and-Exit Control Device

Figure 3:
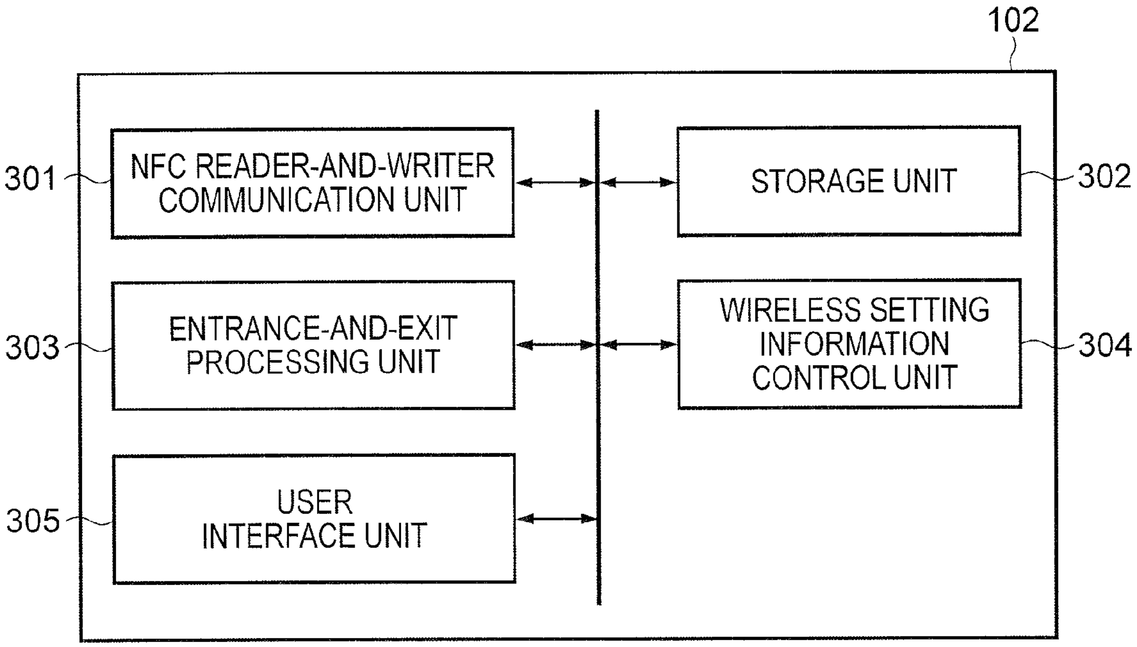
FIG. 3 is a functional block diagram of an entrance-and-exit control device that is used in the entrance-and-exit management system according to the first exemplary embodiment of the present invention.

The structure of the first entrance-and-exit control device 102 according to the first exemplary embodiment will now be described with reference to a functional block diagram shown in FIG. 3. The second entrance-and-exit control device 105 according to the first exemplary embodiment has the same structure as the first entrance-and-exit control device 102, and therefore, a description thereof is omitted herein.

The first entrance-and-exit control device 102 includes, among other things, an NFC reader-and-writer communication unit 301, a storage unit 302, an entrance-and-exit processing unit 303, a wireless setting information control unit 304, and a user interface unit 305.

The entrance-and-exit control device 102, using the NFC reader-and-writer communication unit 301, produces an RF field and transmits and receives data, via NFC, between the NFC reader-and-writer communication unit 301 and an NFC tag communication unit 201 or another NFC reader-and-writer communication unit (not shown) located within communication range.

The storage unit 302 stores wireless setting information required to perform wireless LAN communication within the area 106. The storage unit 302 also retains a wireless setting information selection table for selecting a piece of wireless setting information for the security card 101 from the stored wireless setting information using the ID information transferred from the security card 101 as a key.

Figures 5, 6:
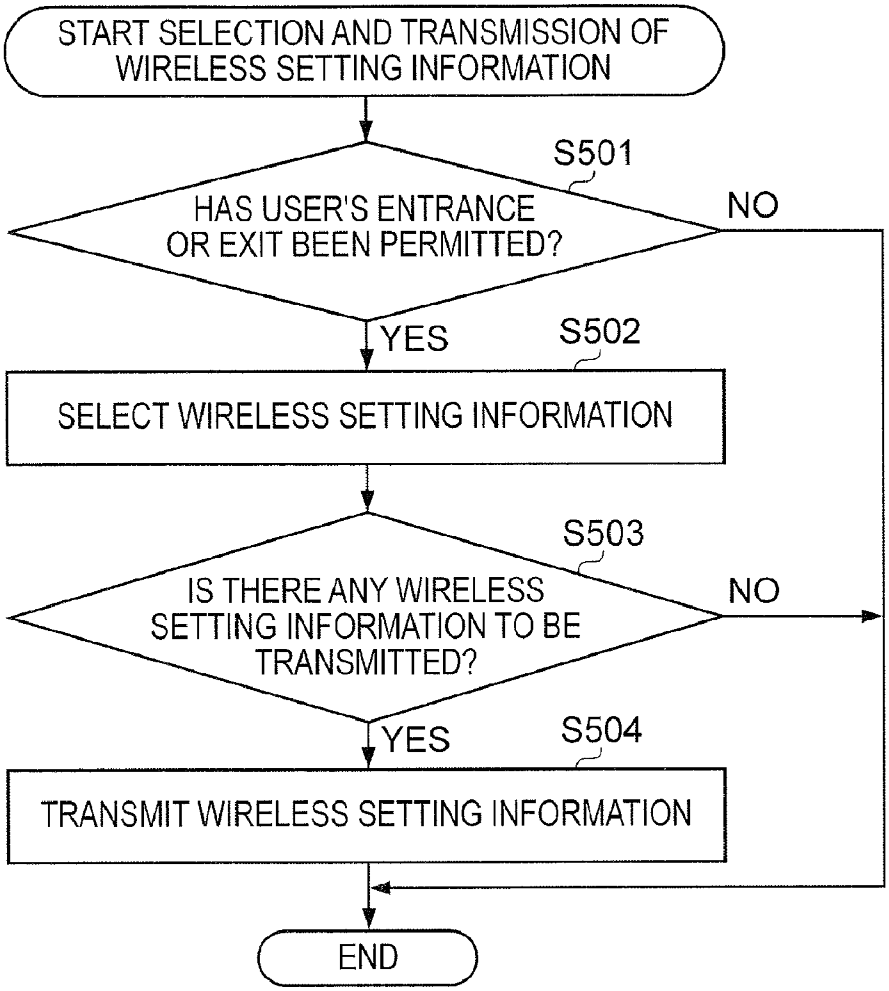
FIG. 5 is a flowchart showing the process of selection and transmission of wireless setting information performed by a wireless setting information control unit in the entrance-and-exit control device.
FIG. 6 shows an example of wireless setting information stored in a storage unit in the entrance-and-exit control device.

FIG. 6 shows an example of the wireless setting information stored in the storage unit 302. As shown in FIG. 6, the ESSID information of wireless LAN networks within the area 106 and the encryption methods and encryption keys of the wireless LAN networks corresponding to the ESSID information are registered as the wireless setting information.

Figures 7, 8:
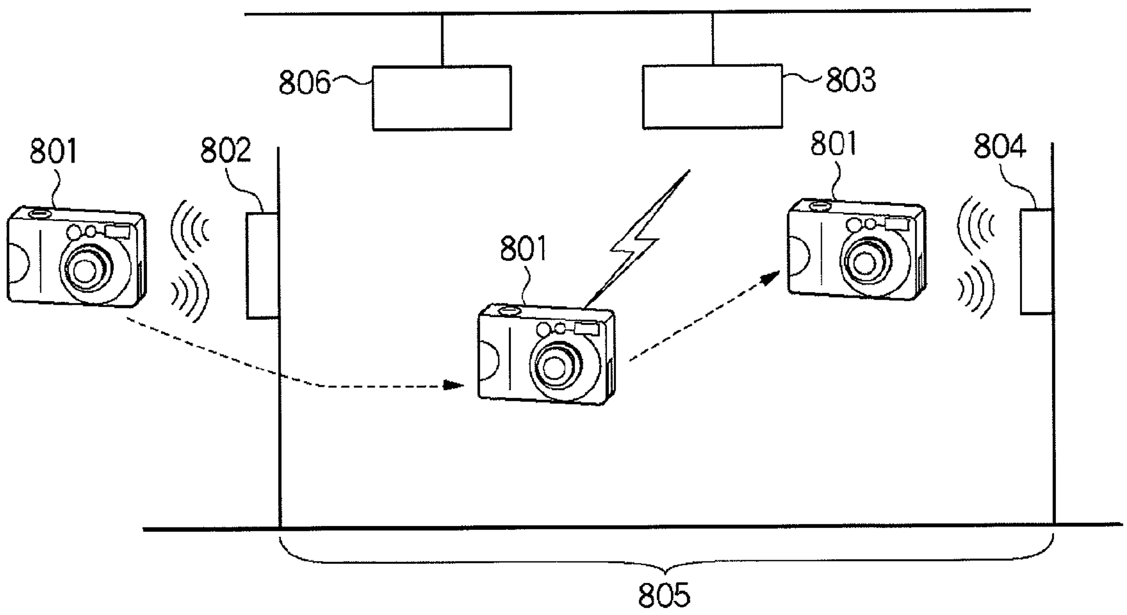
FIG. 7 shows an example of a wireless setting information selection table.
FIG. 8 shows the structure of an entrance-and-exit management system according to a second exemplary embodiment of the present invention.

FIG. 7 shows an example of the wireless setting information selection table. As shown in FIG. 7, the ID information of the security card 101 and the ESSID information corresponding to the ID information are registered in the wireless setting information selection table.

When a user enters or exits the area 106, the entrance-and-exit processing unit 303 submits a request message for the ID information to the security card 101. Then, the entrance-and-exit processing unit 303 determines, on the basis of the ID information transferred from the security card 101, whether the user can enter or exit from the area 106.

The wireless setting information control unit 304 transmits the piece of wireless setting information for the security card 101 to the security card 101 with reference to the wireless setting information selection table stored in the storage unit 302 on the basis of the ID information transferred from the security card 101. In other words, the wireless setting information control unit 304 searches the wireless setting information selection table using the ID information as a key and checks the corresponding ESSID information against the wireless setting information shown in FIG. 6. Then, the wireless setting information control unit 304 selects and transmits the wireless setting information of wireless LAN networks that the user having the security card 101 having the corresponding ID information can use in the area 106. The wireless setting information control unit 304 also transmits a message requesting deletion of wireless setting information to the security card 101.

The user interface unit 305 notifies the user of the result of the entrance and exit processing. The user interface unit 305 also notifies the user whether the user can enter or exit a certain area by, for example, making a sound, turning on a lamp, or displaying a message.

Process Flow of Entrance-and-Exit Management System (Whole Process)

Figure 4:
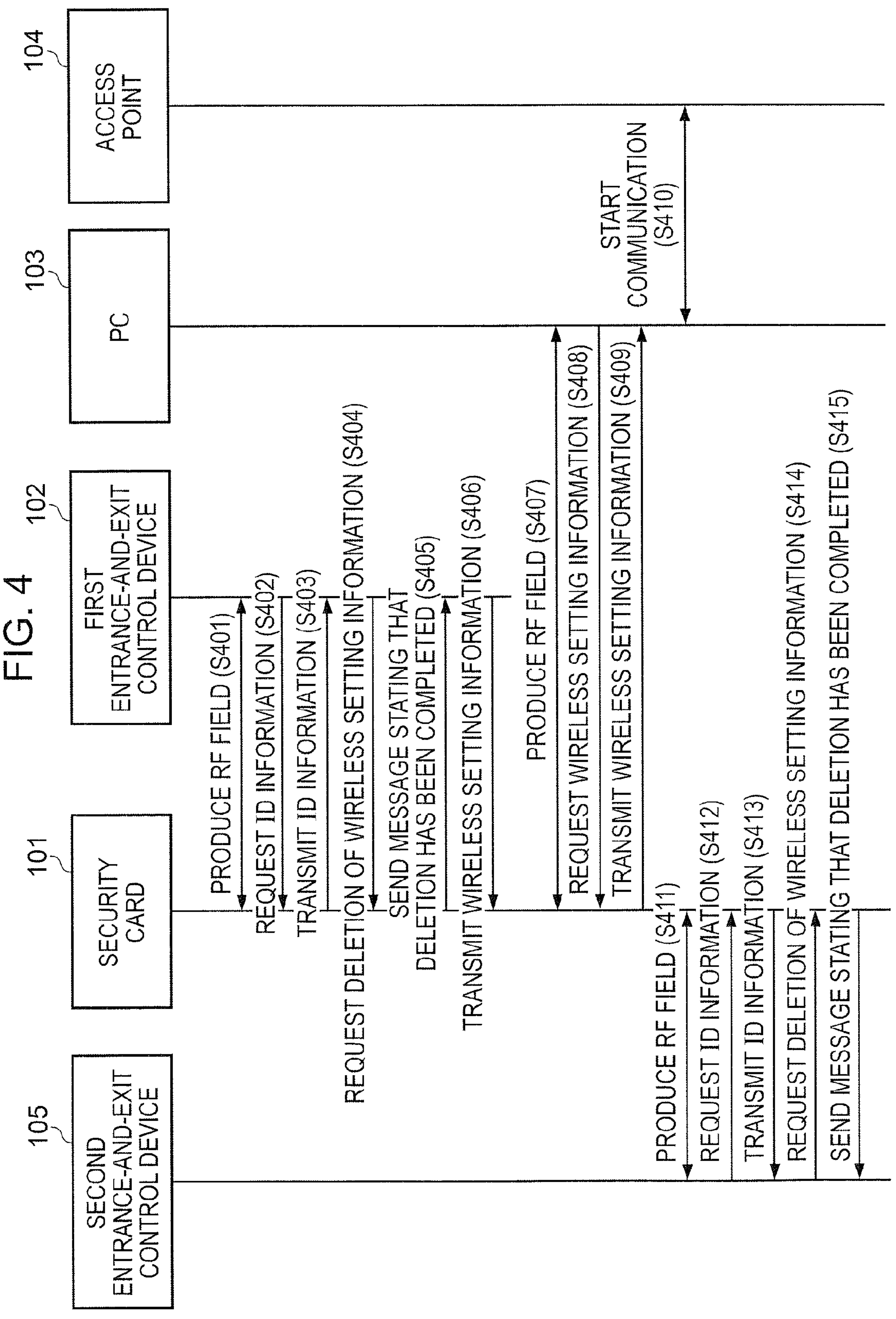
FIG. 4 shows the process flow of the entrance-and-exit management system according to the first exemplary embodiment of the present invention from the time a user enters an area to the time the user exits the area.

The whole process flow of the entrance-and-exit management system according to the first exemplary embodiment from the time a user enters a certain area to the time a user exits from the area will now be described with reference to FIG. 4.

Steps S401 to S406 show the process flow of entrance processing and transferring wireless setting information that is performed between the security card 101 and the first entrance-and-exit control device 102 when the user enters the area 106.

In step S401, when the user brings the security card 101 close to the first entrance-and-exit control device 102, NFC is enabled between the security card 101 and the first entrance-and-exit control device 102, and the security card 101 produces an RF field between the security card 101 and the first entrance-and-exit control device 102 to start NFC.

In step S402, the first entrance-and-exit control device 102 sends a message requesting the ID information of the security card 101 to the security card 101.

In step S403, the security card 101 sends the ID information of the security card 101 to the first entrance-and-exit control device 102. The first entrance-and-exit control device 102 activates the entrance-and-exit processing unit 303 to perform entrance and exit processing on the basis of the obtained ID information. The first entrance-and-exit control device 102 activates the user interface unit 305 to notify the user of the result of the entrance and exit processing after the entrance and exit processing.

In step S404, the first entrance-and-exit control device 102 sends a message requesting deletion of wireless setting information to the security card 101.

In step S405, the security card 101, upon receipt of the message requesting deletion of wireless setting information sent in step S404, activates the wireless setting information control unit 204 to delete the wireless setting information stored in the storage unit 202. The security card 101 sends a message stating that the deletion processing has been completed to the first entrance-and-exit control device 102 after the deletion processing.

In step S406, the first entrance-and-exit control device 102 activates the wireless setting information control unit 304 to select and transmit a piece of wireless setting information to the security card 101, as described below. The security card 101 stores the received piece of wireless setting information in the storage unit 202.

Steps S407 to S410 show the process flow for enabling a user to perform wireless LAN communication with the first access point 104 in the area 106 using the PC 103.

In step S407, when the user brings the security card 101 close to the PC 103 so that NFC is enabled between the security card 101 and the PC 103, the security card 101 produces an RF field between the security card 101 and the PC 103 to start NFC.

In step S408, the PC 103 sends a message requesting wireless setting information to the security card 101.

In step S409, the security card 101, upon receipt of the message requesting wireless setting information in step S408, transmits the wireless setting information stored in the storage unit 202 to the PC 103. The PC 103 sets the received wireless setting information as parameters for wireless LAN communication.

In step S410, the PC 103, which obtained the wireless setting information from the security card 101 in step S409, starts wireless LAN communication with the first access point 104 using the obtained wireless setting information.

Steps S411 to S415 show the process flow of exit processing that is performed between the security card 101 and the second entrance-and-exit control device 105 when the user exits from the area 106.

In step S411, when the user brings the security card 101 close to the second entrance-and-exit control device 105, NFC is enabled between the security card 101 and the second entrance-and-exit control device 105, and the security card 101 produces an RF field between the security card 101 and the second entrance-and-exit control device 105 to start NFC.

In step S412, the second entrance-and-exit control device 105 sends a message requesting the ID information of the security card 101 to the security card 101.

In step S413, the security card 101 sends the ID information of the security card 101 to the second entrance-and-exit control device 105. The second entrance-and-exit control device 105 activates the entrance-and-exit processing unit 303 to perform entrance and exit processing on the basis of the obtained ID information. The second entrance-and-exit control device 105 activates the user interface unit 305 to notify the user of the result of the entrance and exit processing upon completion of the entrance and exit processing.

In step S414, the second entrance-and-exit control device 105 sends a message requesting deletion of wireless setting information to the security card 101.

In step S415, the security card 101, which received the message sent in step S414, activates the wireless setting information control unit 204 to delete the wireless setting information stored in the storage unit 202. The security card 101 sends a message stating that the deletion processing has been completed to the second entrance-and-exit control device 105 upon completion of the deletion processing. In the present exemplary embodiment, when the user exits from the area 106, the second entrance-and-exit control device 105 may transmit another piece of wireless setting information to the security card 101 and the security card 101 may store this piece of information. In this case, the piece of wireless setting information is information used to perform wireless LAN communication in an area other than the area 106.

Process Flow of Entrance-and-Exit Management System (Selection and Transmission of Wireless Setting Information)

The process of selection and transmission of wireless setting information performed by the wireless setting information control unit 304 in the first entrance-and-exit control device 102 in step S406 will now be described with reference to FIG. 5. The process of selection and transmission of wireless setting information performed by the wireless setting information control unit 304 in the second entrance-and-exit control device 105 when the user exits from the area 106 is substantially the same as the process that will be described. As such, a detailed description is omitted herein.

In step S501, the wireless setting information control unit 304 in the first entrance-and-exit control device 102 determines, on the basis of the result of entrance and exit processing performed in step S403, whether the user's entrance or exit has been permitted. When the wireless setting information control unit 304 determines that the user's entrance or exit has been permitted, the process proceeds to step S502. Otherwise, the process of selection and transmission of wireless setting information is completed.

In step S502, the wireless setting information control unit 304 in the first entrance-and-exit control device 102 selects, based on the obtained ID information, the corresponding piece of wireless setting information to be transmitted from the wireless setting information that is stored in the storage unit 202. In this selection process, the wireless setting information selection table stored in the storage unit 202 is searched, based on the ID information, for the corresponding ESSID information. Then, the corresponding piece of wireless setting information is selected based by checking the obtained ESSID information against the wireless setting information stored in the storage unit 302.

In step S503, the wireless setting information control unit 304 in the first entrance-and-exit control device 102 determines, on the basis of the result of the processing in step S502, whether any wireless setting information to be transmitted exists. When the wireless setting information control unit 304 determines that wireless setting information to be transmitted exists, the process proceeds to step S504. Otherwise, the process of selection and transmission of wireless setting information is completed.

In step S504, the wireless setting information control unit 304 in the first entrance-and-exit control device 102 transmits a piece of wireless setting information using the NFC reader-and-writer communication unit 301.

In the present exemplary embodiment, the user enters an area after the setting information for wireless LAN communication that is available in the area has been stored in the security card's 102 storage unit 302 at the time of the entrance and exit processing, as described above. In this arrangement, the user can readily and stably use wireless LAN communication to communicate with a wireless communication device by merely holding the security card 102 close to the wireless communication device in the area 106 and transferring wireless setting information.

Second Exemplary Embodiment

In the first exemplary embodiment, the user enters an area after the setting information for wireless LAN communication that is available in the area has been stored in the security card's 102 storage unit 302 at the time of the entrance and exit processing. Moreover, the user holds the security card 102 close to the wireless communication device in the area to transfer wireless setting information so that the wireless communication device can perform wireless LAN communication in the area.

The present invention is not limited to this arrangement. For example, in another arrangement, a wireless communication terminal that has a wireless LAN communication function and an entrance-and-exit processing function by NFC receives wireless setting information that is available in an area from an entrance-and-exit control device at the time of the entrance and exit processing. Then, the wireless communication terminal performs wireless LAN communication in the area on the basis of the wireless setting information received from the entrance-and-exit control device. In this arrangement, the user can perform wireless LAN communication in an area without the first exemplary embodiment's process of setting wireless setting information (steps S407 to S410). The details of a second exemplary embodiment will now be described.

Structure of Entrance-and-Exit Management System

FIG. 8 shows the structure of an entrance-and-exit management system according to the second exemplary embodiment of the present invention. The entrance-and-exit management system according to the second exemplary embodiment includes a wireless communication terminal 801, a first entrance-and-exit control device 802, a first access point 803, a second entrance-and-exit control device 804, and a second access point 806.

The wireless communication terminal 801, the first entrance-and-exit control device 802, and the second entrance-and-exit control device 804 have an NFC function. The wireless communication terminal 801, the first access point 803, and the second access point 806 have a wireless LAN communication function.

In the entrance and exit processing of the entrance-and-exit management system, when the user wishes to enter an area 805, the user holds the wireless communication terminal 801 close to the first entrance-and-exit control device 802. Data, such as the user ID information, is then exchanged between the wireless communication terminal 801 and the first entrance-and-exit control device 802 by NFC. The first entrance-and-exit control device 802 determines, on the basis of the received user ID information of the wireless communication terminal 801, whether the user can enter the area 805.

When the entrance and exit processing has successfully completed and the user permitted to enter the area 805, the first entrance-and-exit control device 802 transfers, via NFC, to the wireless communication terminal 801 wireless setting information required to communicate by wireless LAN communication with the first access point 803 in the area 805. The wireless setting information includes, among other things, information, such as an ESSID, an encryption method, and an encryption key. The wireless communication terminal 801 stores the wireless setting information transferred from the first entrance-and-exit control device 802 and sets the wireless setting information as parameters for wireless LAN communication. The user performs wireless LAN communication between the wireless communication terminal 801 and the first access point 803 using the transferred wireless setting information after entering the area 805.

Structure of Wireless Communication Terminal

Figure 9:
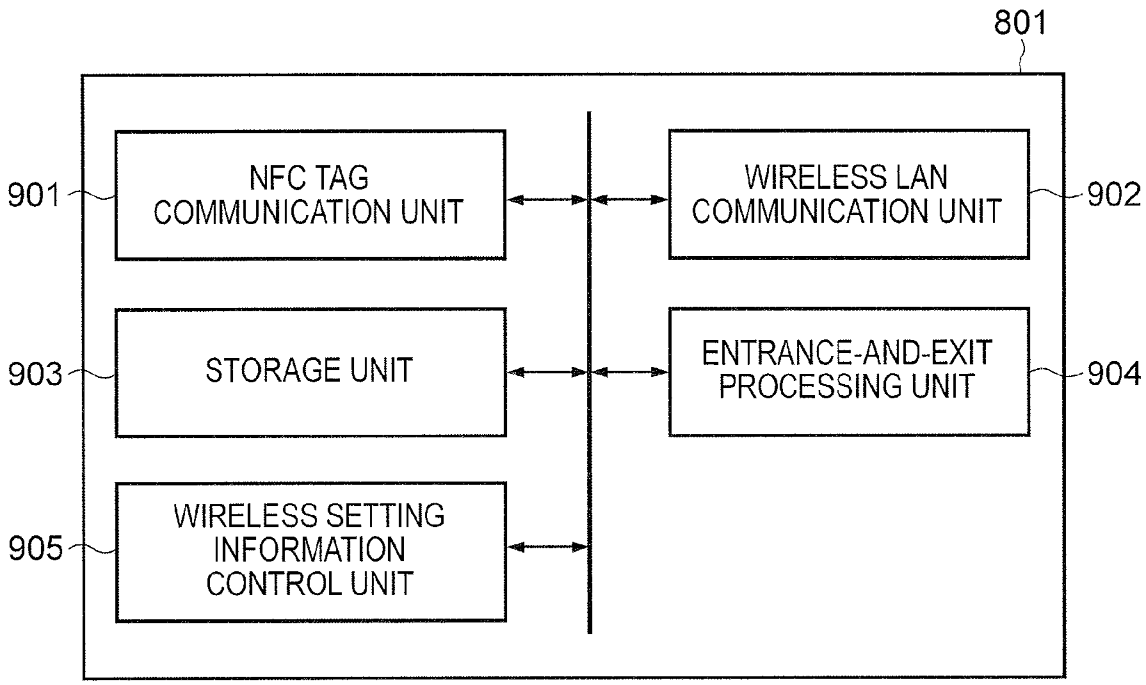
FIG. 9 is a functional block diagram of a wireless communication terminal that is used in the entrance-and-exit management system according to the second exemplary embodiment of the present invention.

The structure of the wireless communication terminal 801 (e.g., processing device) according to the second exemplary embodiment will now be described with reference to a functional block diagram shown in FIG. 9.

The wireless communication terminal 801 includes, at least, an NFC tag communication unit 901, a wireless LAN communication unit 902, a storage unit 903, an entrance-and-exit processing unit 904, and a wireless setting information control unit 905.

The NFC tag communication unit 901 is activated by power that is supplied by electromagnetic induction from an RF field produced between the NFC tag communication unit 901 and an NFC reader-and-writer unit within communication range. The NFC tag communication unit 901 performs NFC by responding to a request from the NFC reader-and-writer unit.

The wireless communication terminal 801 performs wireless communication with the access points 803 and 806 by wireless LAN communication using the wireless LAN communication unit 902.

The storage unit 903 stores, for example, the ID information of the wireless communication terminal 801, which is used in the entrance and exit processing, and the wireless setting information transferred from the entrance-and-exit control device 802.

The entrance-and-exit processing unit 904 transmits the ID information stored in the storage unit 903 in response to a request message for the ID information from the entrance-and-exit control device 802 when the user enters or exits the area 805.

The wireless setting information control unit 905 deletes the wireless setting information stored in the storage unit 903 in response to a message requesting deletion of the wireless setting information from the entrance-and-exit control device 802 or 804.

The structures of the entrance-and-exit control devices 802 and 804 according to the second exemplary embodiment are the same as those of the entrance-and-exit control devices 102 and 105 according to the first exemplary embodiment. As such, detailed descriptions are omitted herein.

Process Flow of Entrance-and-Exit Management System

Figure 10:
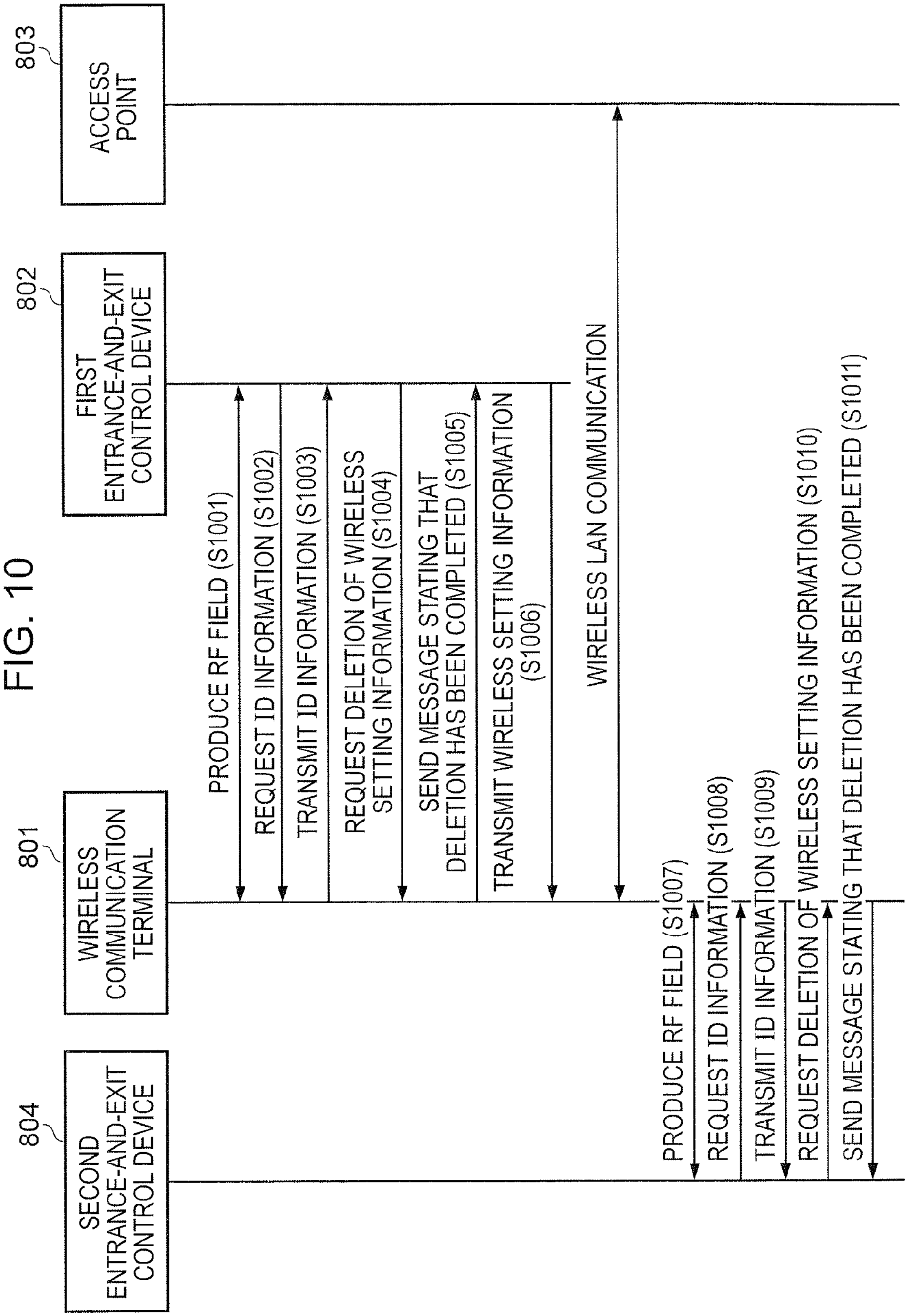
FIG. 10 shows the process of the entrance-and-exit management system according to the second exemplary embodiment of the present invention.

The process flow of the entrance-and-exit management system according to the second exemplary embodiment from the time the user enters a certain area to the time the user exits from the area will now be described with reference to FIG. 10.

Steps S1001 to S1006 show the process flow of entrance processing and transferring wireless setting information that is performed between the wireless communication terminal 801 and the first entrance-and-exit control device 802 when the user attempts to enter the area 805.

In step S1001, when the user brings the wireless communication terminal 801 close to the first entrance-and-exit control device 802, NFC is enabled between the wireless communication terminal 801 and the first entrance-and-exit control device 802, and the wireless communication terminal 801 produces an RF field between the wireless communication terminal 801 and the first entrance-and-exit control device 802 to start NFC.

In step S1002, the first entrance-and-exit control device 802 sends a message requesting the ID information of the wireless communication terminal 801 to the wireless communication terminal 801.

In step S1003, the wireless communication terminal 801 sends the ID information of the wireless communication terminal 801 to the first entrance-and-exit control device 802. The first entrance-and-exit control device 802 activates the entrance-and-exit processing unit 303 to perform entrance and exit processing on the basis of the obtained ID information. The first entrance-and-exit control device 802 activates the user interface unit 305 to notify the user of the result of the entrance and exit processing upon completion of the entrance and exit processing.

In step S1004, the first entrance-and-exit control device 802 sends a message requesting deletion of wireless setting information to the wireless communication terminal 801.

In step S1005, the wireless communication terminal 801, which received the message requesting deletion of wireless setting information sent in step S1004, activates the wireless setting information control unit 905 to delete the wireless setting information stored in the storage unit 903. The wireless communication terminal 801 then sends a message stating that the deletion processing has been completed to the first entrance-and-exit control device 802 after completion of the deletion processing.

In step S1006, the first entrance-and-exit control device 802 activates the wireless setting information control unit 304 to select and transmit a piece of wireless setting information to the wireless communication terminal 801, as described in steps S501 to S504. The wireless communication terminal 801 stores the piece of wireless setting information transferred from the first entrance-and-exit control device 802 in the storage unit 903 as parameters for wireless LAN communication.

After the user enters an area 805, the wireless communication terminal 801 performs wireless LAN communication with the first access point 803 with the wireless setting information stored in the storage unit 903.

Steps S1007 to S1011 show the process flow of exit processing performed between the wireless communication terminal 801 and the second entrance-and-exit control device 804 when the user exits from the area 805.

In step S1007, when the user brings the wireless communication terminal 801 close to the second entrance-and-exit control device 804, NFC is enabled between the wireless communication terminal 801 and the second entrance-and-exit control device 804, and the wireless communication terminal 801 produces an RF field between the wireless communication terminal 801 and the second entrance-and-exit control device 804 to start NFC.

In step S1008, the second entrance-and-exit control device 804 sends a message requesting the ID information of the wireless communication terminal 801 to the wireless communication terminal 801.

In step S1009, the wireless communication terminal 801 sends the ID information of the wireless communication terminal 801 to the second entrance-and-exit control device 804. The second entrance-and-exit control device 804 activates the entrance-and-exit processing unit 303 to perform entrance and exit processing on the basis of the obtained ID information. The second entrance-and-exit control device 804 activates the user interface unit 305 to notify the user of the result of the entrance and exit processing upon completion of the entrance and exit processing.

In step S1010, the second entrance-and-exit control device 804 sends a message requesting deletion of wireless setting information to the wireless communication terminal 801.

In step S1011, the wireless communication terminal 801, which received the message sent in step S1010, activates the wireless setting information control unit 905 to delete the wireless setting information stored in the storage unit 903. The wireless communication terminal 801 sends a message stating that the deletion processing has been completed to the second entrance-and-exit control device 804 upon completion of the deletion processing.

In the present exemplary embodiment, when the user exits from the area 805, the second entrance-and-exit control device 804 may transmit another piece of wireless setting information to the wireless communication terminal 801 and the wireless communication terminal 801 may store this piece of information in the storage unit 903. In this case, the piece of wireless setting information is information that is used to perform wireless LAN communication in an area other than the area 805.

In the present exemplary embodiment, the wireless communication terminal 801 that has a wireless LAN communication function and an entrance-and-exit processing function by NFC receives wireless setting information available in an area 805 from the entrance-and-exit control devices 802 and 804 at the time of the entrance and exit processing, as described above. Then, the wireless communication terminal 801 performs wireless LAN communication in the area 805 on the basis of the wireless setting information received from the entrance-and-exit control devices 802 and 804. In this arrangement, the user can readily and stably use wireless LAN communication by using the wireless communication terminal 801 in the area.

Third Exemplary Embodiment

In the first and second exemplary embodiments, the user performs wireless LAN communication in an area by obtaining wireless setting information that is available in the area from the entrance-and-exit control device at the time of the entrance and exit processing.

Wireless setting information that is retained by the entrance-and-exit control device in the entrance-and-exit management system and information that is registered in the wireless setting information selection table always need to be updated. For example, networks that users can use are changed, new users are added, or the ESSIDs of access points, encryption keys to be used, and the like are updated at predetermined intervals in view of security. In these cases, the wireless setting information that is retained by the entrance-and-exit control device and the information in the wireless setting information selection table also need to be updated in synchronization with these updates.

In a third exemplary embodiment, an update server that communicates with individual entrance-and-exit control devices is provided. In this exemplary embodiment, when the update server detects that wireless setting information for wireless LAN communication in an area is changed, wireless setting information that is stored in the individual entrance-and-exit control devices is updated.

Thus, when wireless setting information in the area is changed, the information that is stored in the entrance-and-exit control devices can be updated. Moreover, the user can perform wireless LAN communication in the area using the same steps as in the first and second exemplary embodiments without being conscious of the change of the wireless setting information.

Structure of Entrance-and-Exit Management System

Figure 11:
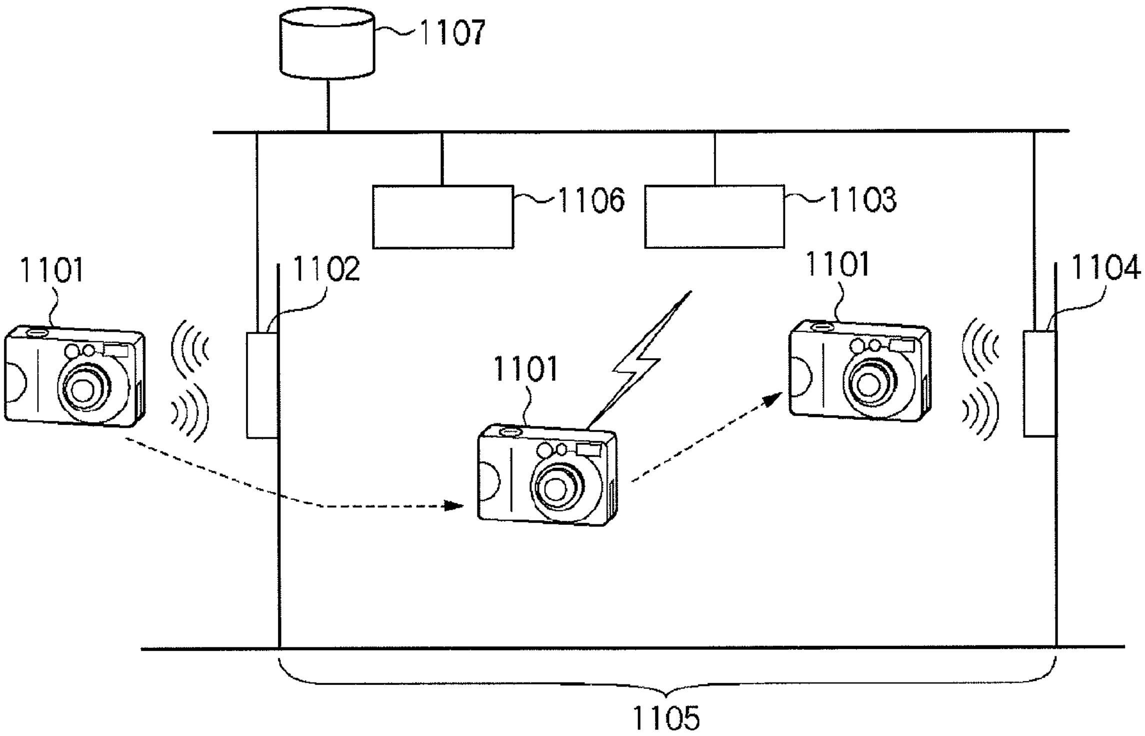
FIG. 11 shows the structure of an entrance-and-exit management system according to a third exemplary embodiment of the present invention.

FIG. 11 shows the structure of an entrance-and-exit management system according to the third exemplary embodiment of the present invention. The entrance-and-exit management system according to the third exemplary embodiment includes a wireless communication terminal 1101, a first entrance-and-exit control device 1102, a first access point 1103, a second entrance-and-exit control device 1104, a second access point 1106, and an update server 1107. In this exemplary embodiment, the update server 1107 can communicate with the entrance-and-exit control devices 1102 and 1104 and the access points 1103 and 1106 through a wired network.

Process Flow of Update Server

Figure 12:
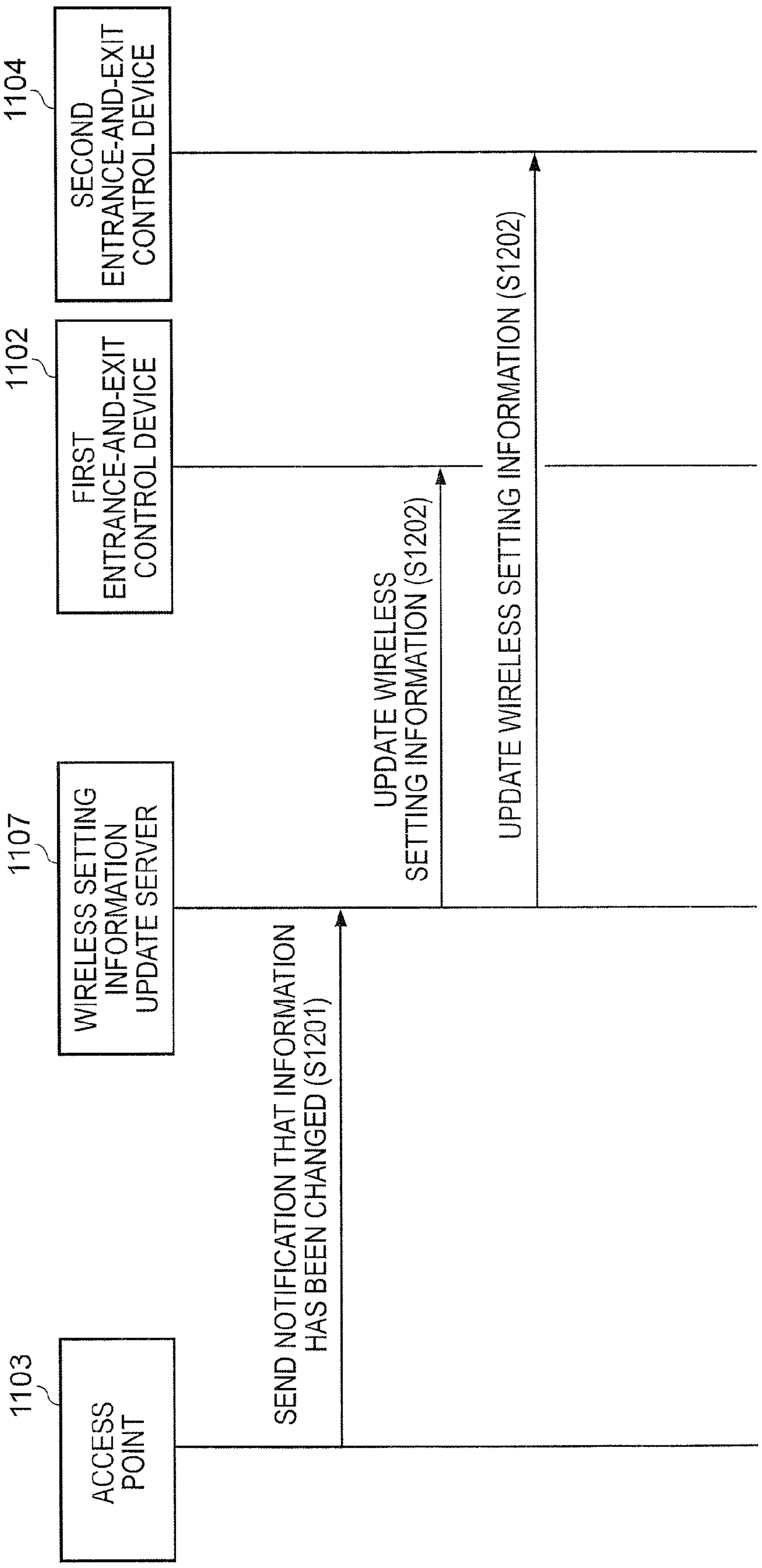
FIG. 12 shows the process of updating wireless setting information of the entrance-and-exit management system according to the third exemplary embodiment of the present invention.

The process of updating wireless setting information performed by the update server 1107 when the wireless setting information of an access point has been updated will now be described with reference to FIG. 12.

In step S1201, when the wireless setting information of the access point 1103 has been changed, the access point 1103 sends a message stating that information has been changed to the update server 1107. The message stating that information has been changed includes the access point's 1103 changed wireless setting information.

In step S1202, the update server 1107 sends a message requesting updating of wireless setting information that includes the changed wireless setting information to the entrance-and-exit control devices 1102 and 1104. The entrance-and-exit control devices 1102 and 1104, upon receipt of the message requesting updating of wireless setting information, update the wireless setting information stored in their respective storage units 302 with the update.

As is apparent from the aforementioned description, according to the present exemplary embodiment, wireless LAN communication can be performed with the most up-to-date wireless setting information while realizing the advantages achieved by the entrance-and-exit management system according to the first or second exemplary embodiments.

In the present exemplary embodiment, the access point 1103 sends the message stating that information has been changed to the update server 1107. Alternatively, for example, the update server 1107 may periodically poll the access points 1103 and 1106 to detect a change of wireless setting information. Please note that any method in which the update server 1107 obtains changed/updated wireless setting information that would enable practice of the present invention is applicable.

Moreover, even when a network administrator updates the wireless setting information selection table in the update server 1107, the update server 1107 performs step S1202 to update information stored in the individual entrance-and-exit control devices 1102 and 1104.

In the aforementioned exemplary embodiments, setting related to wireless communication to connect to an access point, where the access point is connected to a network, can be readily and stably performed without troubling the user.

In the aforementioned description, wireless setting information received from the entrance-and-exit control device is set as parameters for wireless LAN communication. However, the setting information received from the entrance-and-exit control device may be setting information other than parameters for wireless LAN communication of devices in an area that are controlled by the entrance-and-exit control device. For example, the setting information may be setting information for restricting various types of function of a copy machine, a printer, a computer, a scanner, a camera, or the like for individual users. The setting information that may be received is not limited to the above, and any setting information that would enable practice of the present invention is applicable.

The present invention may be applied to a system that includes a plurality of devices (e.g., a host computer, an interface device, a reader, and a printer) or an apparatus that includes a single device (e.g., a copy machine or a facsimile machine).

In another embodiment of the present invention, a storage medium stores program codes of software that perform the functions according to the aforementioned exemplary embodiments, and the storage medium is provided to a system or an apparatus and a computer (a central processing unit (CPU) or a micro processing unit (MPU)) included in the system or the apparatus reads and executes the program codes stored in the storage medium.

In this case, the program codes read from the storage medium perform the functions according to the aforementioned exemplary embodiments, and thus the present invention includes the storage medium, which stores the program codes.

Media that can be used as storage media to supply the program codes include, but are not limited to, floppy disks, hard disks, optical disks, magneto-optical disks, compact disk read only memory (CD-ROM), compact disk recordable (CD-R), magnetic tapes, nonvolatile memory cards, and ROMs.

Moreover, an operating system (OS) operating on a computer may execute some or all of the actual processing to perform the functions of the aforementioned exemplary embodiments according to instructions from the program codes.

Moreover, the program codes read from the storage medium may be written to a memory included in, for example, a function expansion board inserted in a computer or a function expansion unit connected to a computer. Then, for example, a CPU included in the function expansion board, the function expansion unit, or the like may execute some or all of the actual processing to perform the functions of the aforementioned exemplary embodiments according to instructions from the program codes.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-171655 filed Jun. 10, 2005, which is hereby incorporated by reference herein in its entirety.

What is claimed is:

1. A control system that manages a user's entry into and exit from an area based on ID information of a device in the user's possession, the control system comprising:

a determining unit that determines, based on the ID information of the device, whether the user can enter or exit the area; and a transmitting unit that transmits, based on the result of the determination by the determining unit, setting information used for communication in the area to the device.

2. The control system according to claim 1, wherein the setting information is used to communicate with an apparatus located in the area.

3. The control system according to claim 1, wherein the setting information includes parameters for wireless communication used to communicate with a wireless access point unit located in the area.

4. The control system according to claim 1, wherein the ID information is transferred from the device by short-range wireless communication.

5. The control system according to claim 1, wherein the setting information corresponds to the ID information of the device.

6. The control system according to claim 1, further comprising:

an instructing unit that sends the device, based on the result of the determination by the determining unit, an instruction for deleting setting information stored in the device.

7. The control system according to claim 1, wherein the setting information is transmitted from the device to a different device and is used by the different device.

8. The control system according to claim 1, wherein the device uses the setting information to use an apparatus located in the area.

9. The control system according to claim 1, further comprising:

a storage unit that stores the setting information transmitted from the transmitting unit; and a control unit that controls updating of the setting information used for communication in the area, wherein the control unit updates the setting information stored in the storage unit when the setting information used for communication in the area is updated.

10. A method for controlling a control system that manages a user's entry into and exit from an area on the basis of ID information of a device in the user's possession, the method comprising:

determining, based on the ID information of the device, whether the user can enter or exit the area; and transmitting, based on the result of determining the ID information, setting information used for communication in the area to the device.

11. The method according to claim 10, wherein the setting information is used to communicate with an apparatus located in the area.

12. The method according to claim 10, wherein the setting information includes parameters for wireless communication used to communicate with a wireless access point unit located in the area.

13. The method according to claim 10, wherein the ID information is transferred from the device by short-range wireless communication.

14. The method according to claim 10, wherein the setting information corresponds to the ID information of the device.

15. The method according to claim 10, further comprising deleting, based on determination of the ID information, setting information stored in the device.

16. The method according to claim 10, wherein the setting information is transmitted from the device to a different device and is used by the different device.

17. The method according to claim 10, wherein the device uses the setting information to use an apparatus located in the area.

18. The method according to claim 10, further comprising updating the setting information that is transmitted when the setting information used for communication in the area is updated.

* * * * *